(12) United States Patent
Matthews (10) Patent No.: US 7,975,480 B2
(45) Date of Patent: Jul. 12, 2011

(54) APPARATUS, SYSTEM, AND METHOD FOR PREVENTING OVERSPEED OF A TURBOCHARGER

(75) Inventor: Jeffery Matthews, Columbus, IN (US)

(73) Assignee: Cummins, Inc, Minneapolis, MN (US)

( * ) Notice: Subject to any disclaimer, the term of this patent is extended or adjusted under 35 U.S.C. 154(b) by 720 days.

(21) Appl. No.: 11/967,972

(22) Filed: Dec. 31, 2007

(65) Prior Publication Data
US 2009/0165458 A1 Jul. 2, 2009

(51) Int. Cl.
F02B 33/44 (2006.01)
F02B 33/00 (2006.01)
G06F 19/00 (2011.01)

(52) U.S. Cl. .................. 60/612; 123/562; 701/101

(58) Field of Classification Search ........... 60/612; 123/562; 701/101
See application file for complete search history.

(56) References Cited

U.S. PATENT DOCUMENTS

| | | | | |
|---|---|---|---|---|
| 5,199,261 A | * | 4/1993 | Baker | 60/612 |
| 7,426,831 B2 | * | 9/2008 | Grissom | 60/612 |
| 7,578,129 B2 | * | 8/2009 | Perrin et al. | 60/612 |
| 7,650,218 B2 | * | 1/2010 | Andreae et al. | 701/101 |
| 7,769,522 B2 | * | 8/2010 | Andreae et al. | 60/602 |
| 2003/0074899 A1 | * | 4/2003 | Yamaguchi et al. | 60/612 |
| 2007/0295007 A1 | * | 12/2007 | McNulty et al. | 60/612 |
| 2009/0222190 A1 | * | 9/2009 | Andreae et al. | 60/602 |
| 2009/0255517 A1 | * | 10/2009 | Ishikawa et al. | 123/562 |

FOREIGN PATENT DOCUMENTS

| | | | |
|---|---|---|---|
| JP | 61200331 A | * | 9/1986 |
| JP | 2007077900 A | * | 3/2007 |
| JP | 2007138845 A | * | 6/2007 |

OTHER PUBLICATIONS

A fully Certified English Translation Takemura et al. (Pub. No. JP 61-200331 A), published on Sep. 4, 1986.*

* cited by examiner

Primary Examiner — Thai Ba Trieu
(74) Attorney, Agent, or Firm — Kunzler Needham Massey & Thorpe; J. Bruce Schelkopf (57) ABSTRACT

An apparatus, system, and method are disclosed for preventing overspeed of a turbocharger. The apparatus includes a two-stage turbocharger system with a high pressure and a low pressure turbocharger. A bypass valve that divides an exhaust flow into a primary exhaust flow and a bypass flow. A relief valve vents a portion of the primary exhaust flow around the high pressure turbocharger. The low pressure turbocharger receives the bypass flow, the primary exhaust flow, and the vented portion of the primary exhaust flow. The apparatus includes a controller having a protection condition module that determines a protection indicator, and a relief valve control module that controls the relief valve according to the protection indicator.

19 Claims, 10 Drawing Sheets

APPARATUS, SYSTEM, AND METHOD FOR PREVENTING OVERSPEED OF A TURBOCHARGER

BACKGROUND OF THE INVENTION

1. Field of the Invention

This invention relates to turbocharger systems and more particularly relates to turbocharger systems with two turbocharger stages in series.

2. Description of the Related Art

Emissions regulations on internal combustion engines have become quite stringent and now impose significant constraints on engine design. Various features have been added to engines to respond to new emissions regulations, and to provide operational freedom to pursue the competing goals of meeting emissions and maintaining engine performance. Recent engine development cycles are increasingly using advanced turbocharger systems, such as variable geometry turbos and two-turbo systems. Two-turbo systems allow increased charge density by staging air compression. Further, they allow an engine to exhibit both responsiveness with a small, high pressure turbo stage, and high capacity with a large, lower pressure turbo stage.

One drawback of the two stage turbo system is that at fully rated operation, the high pressure (smaller) turbo is not able to accept the entire exhaust flow of the engine or the turbocharger will overspeed. One solution in the current art is to install a bypass line around the high pressure turbo and direct a portion of the exhaust directly to the lower pressure turbo. In many cases, a significant majority of the exhaust is flowing through the bypass line when the engine is operating at fully rated power. It is desirable to have a large flow capacity difference between the high pressure turbo and the low pressure turbo, to maximize the responsiveness of the high pressure turbo while maximizing the flow capacity of the low pressure turbo. However, the greater the flow capacity difference between the high pressure turbo and the low pressure turbo, the larger the bypass valve must be. Therefore, the bypass valve controlling the bypass line is typically large and has a relatively slow response time to go from open to closed. By contrast, the engine is preferably quite responsive. Therefore, in the current art, the engine and/or the turbocharger flow targets must have artificially reduced response to avoid overspeeding the high pressure turbo in transient situations.

Additionally, with a two-stage system in the current art, the high pressure compressor may have a bypass valve because at high inlet air flow rates, the high pressure compressor becomes a restriction in the intake air system. When the compressor bypass valve opens, the compressor then stops absorbing work from the high pressure turbocharger, which can cause instability or overspeed of the high pressure turbocharger, as well as reduce operator satisfaction with inconsistent engine performance.

SUMMARY OF THE INVENTION

From the foregoing discussion, it should be apparent that a need exists for an apparatus, system, and method that prevents overspeed of a turbocharger. Beneficially, such an apparatus, system, and method would prevent overspeed of the turbocharger without limiting the responsiveness of the engine.

The present invention has been developed in response to the present state of the art, and in particular, in response to the problems and needs in the art that have not yet been fully solved by currently available turbocharger speed control systems. Accordingly, the present invention has been developed to provide an apparatus, system, and method for preventing overspeed of a turbocharger that overcomes many or all of the above-discussed shortcomings in the art.

An apparatus is disclosed to prevent overspeed of a turbocharger. The apparatus includes a bypass valve that divides an exhaust flow between a bypass flow and a primary exhaust flow. The apparatus further includes a first turbocharger comprising a high pressure charging stage and a second turbocharger comprising a low pressure charging stage. The first turbocharger receives the primary exhaust flow and the second turbocharger receives the bypass flow and the primary exhaust flow. The apparatus further includes a relief valve that vents at least a portion of the primary exhaust flow when the relief valve is open.

In one embodiment, the relief valve opens according to an exhaust manifold pressure indicator, a first turbocharger speed indicator, a compressor bypass indicator, a primary exhaust flow indicator, and/or an engine transient event indicator. The engine transient event indicator may be an indication of whether an engine speed-load change amount is greater than a first threshold value, and/or whether a user input request change amount is greater than the first threshold value. The relief valve may be a spring-actuated mechanical valve, or an electronically actuated valve. The apparatus may include a protection condition module that functionally executes determining the protection indicator, and a relief valve control module that functionally executes controlling the relief valve according to the protection indicator.

A method is disclosed for preventing overspeed of a turbocharger. The method includes providing a bypass valve that divides an exhaust flow between a bypass flow and a primary exhaust flow. The method further includes providing a first turbocharger comprising a high pressure charging stage and a second turbocharger comprising a low pressure charging stage. The first turbocharger receives the primary exhaust flow and the second turbocharger receives the bypass flow and the primary exhaust flow. The method further includes providing a relief valve that vents at least a portion of the primary exhaust flow when the relief valve is open, and opening the relief valve according to a protection indicator.

In one embodiment, the method includes opening the relief valve according to the protection indicator by determining an engine transient event indicator and opening the relief valve according to the engine transient event indicator. The method includes determining the engine transient event indicator by determining whether an engine speed-load change, or a target engine speed-load change, is greater than a first threshold value. The method may include determining the engine transient event indicator by determining whether a user input request change is greater than a second threshold value. In one embodiment, the method includes determining the protection indicator by determining: a first turbocharger overspeed indicator, a compressor bypass indicator, a primary exhaust flow indicator, and/or an exhaust manifold pressure indicator.

A system is disclosed to prevent overspeed of a turbocharger. The system includes an internal combustion engine producing an exhaust flow, and a bypass valve that divides the exhaust flow between a bypass flow and a primary exhaust flow. The system further includes a first turbocharger comprising a high pressure charging stage and a second turbocharger comprising a low pressure charging stage. The first turbocharger receives the primary exhaust flow and the second turbocharger receives the bypass flow and the primary exhaust flow. The system further includes a relief valve that vents at least a portion of the primary exhaust flow when the relief valve is open.

In one embodiment, the system includes a controller comprising a protection condition module and a relief valve control module. The protection condition module determines a protection indicator, and the relief valve control module controls the relief valve according to the protection indicator. The protection indicator may be an engine transient event indicator.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1A:
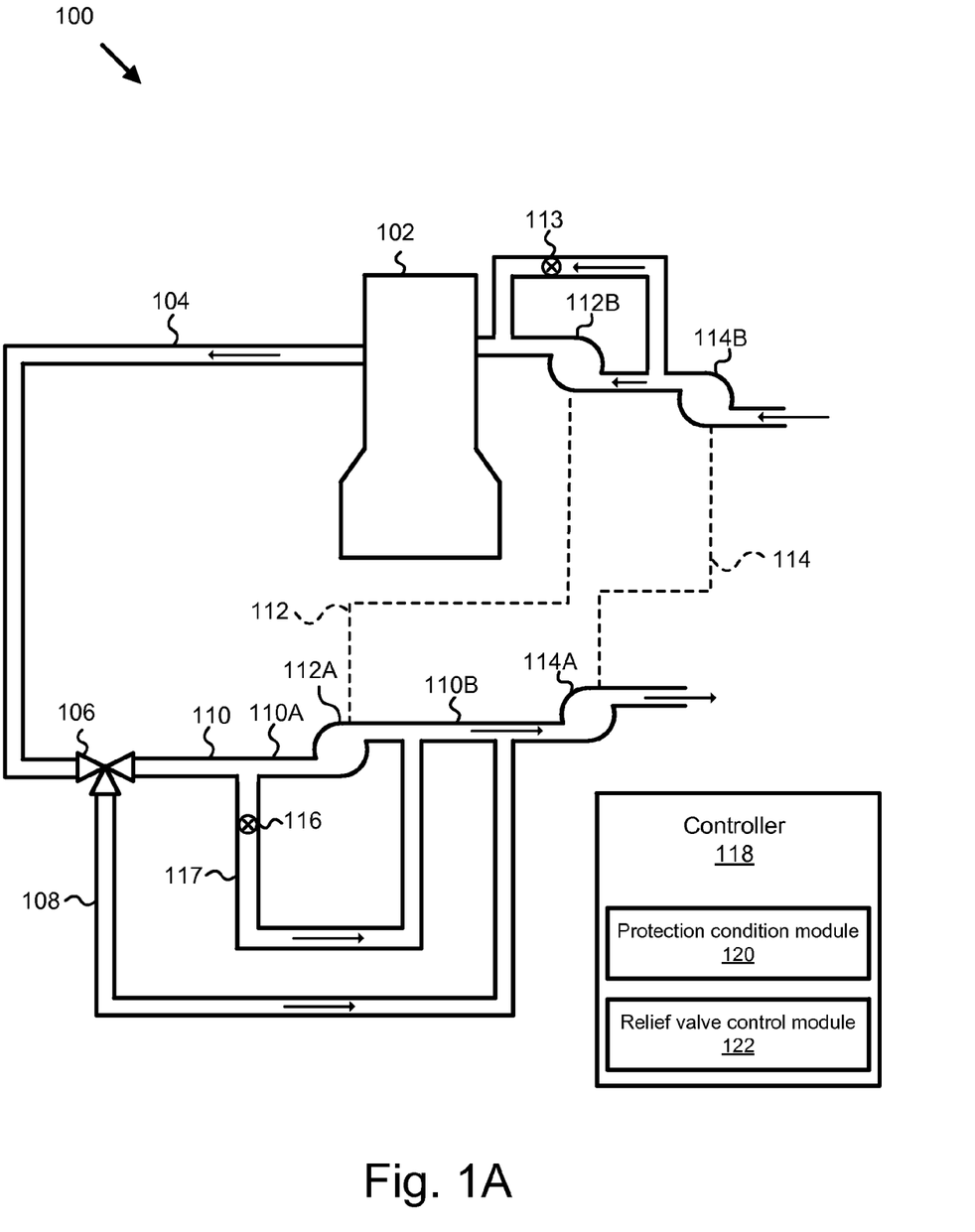
FIG. 1A is a schematic block diagram depicting one embodiment of a system to prevent overspeed of a turbocharger in accordance with the present invention.

FIG. 1 is a schematic illustration depicting one embodiment of a system 100 to prevent overspeed of a turbocharger in accordance with the present invention. The system 100 may comprise various sensors for monitoring operating conditions within a given embodiment. Sensors may be strategically disposed within the system 100 and may be in communication with a controller. Sensors for the system 100 may include temperature sensors, pressure sensors, and mass flow sensors. One of skill in the art may determine the preferred placement and the preferred types of sensors useful for a particular application. Furthermore, sensors may comprise virtual sensors for detecting operating parameters of the system 100 based on other information, such as engine speed (rpm) for example.

The system 100 comprises an internal combustion engine 102 producing an exhaust flow 104. The system 100 further includes a bypass valve 106 that divides the exhaust flow 104 between a bypass flow 108 and a primary exhaust flow 110. The system 100 further includes a first turbocharger 112 comprising a high pressure charging stage that receives the primary exhaust flow 110. The first turbocharger 112 includes a turbine 112A and a compressor 112B, mechanically coupled with a turbocharger 112 shaft. The compressor 112B may have a compressor bypass valve 113 in a compressor bypass line. In one embodiment, when the intake air flow to the engine 102 exceeds a threshold flow amount, the compressor bypass valve 113 opens. In alternate embodiments, the compressor bypass valve 113 may open at a set engine 102 speed, intake manifold pressure, low pressure compressor 114B pressure outlet, or under similar conditions known in the art.

Figure 1B:
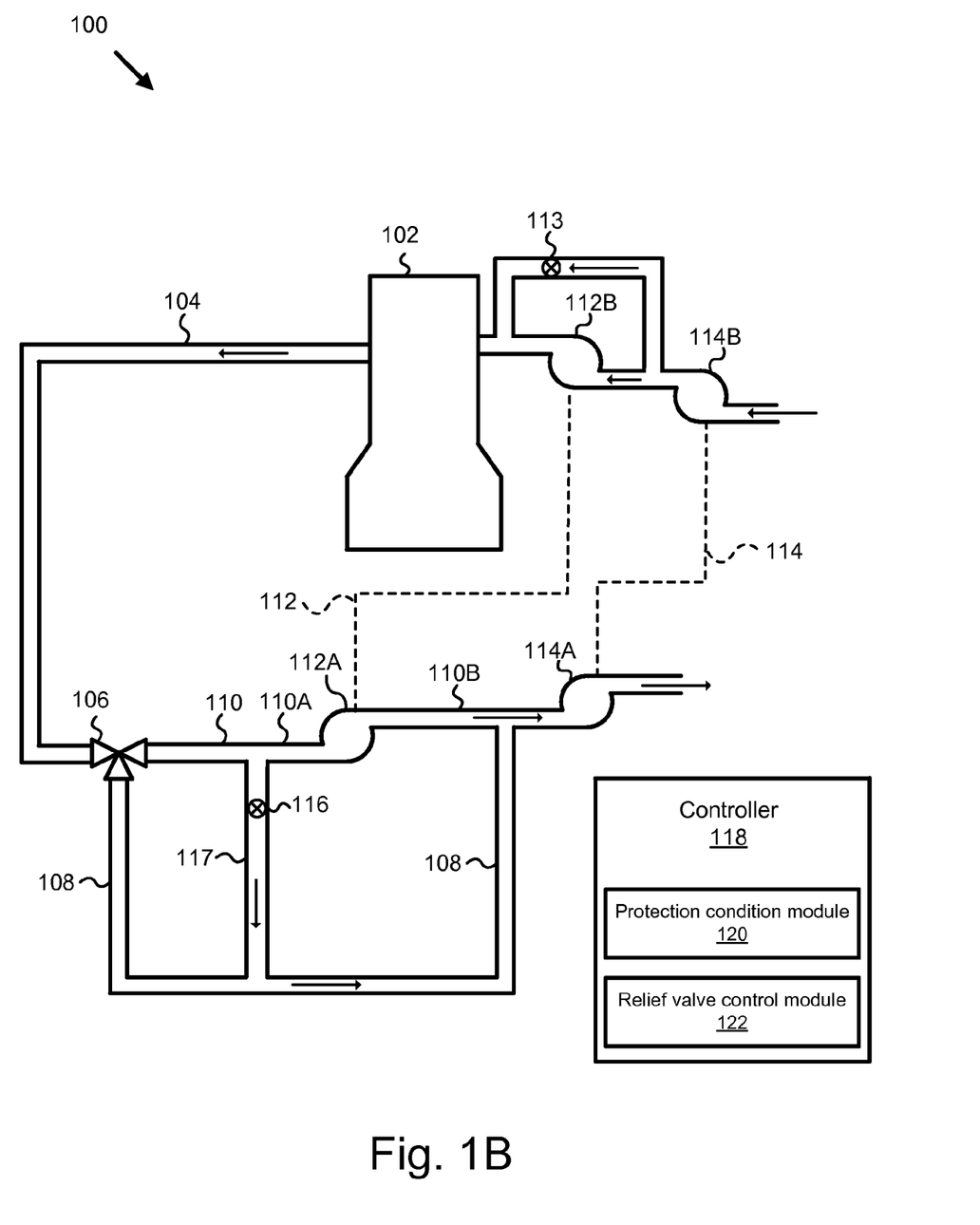
FIG. 1B is a schematic block diagram depicting an alternate embodiment of a system to prevent overspeed of a turbocharger in accordance with the present invention.

The system further includes a relief valve 116 that vents at least a portion of the primary exhaust flow 110 when the relief valve 116 is open. Venting of at least a portion of the primary exhaust flow 110 may include sending a portion of the primary exhaust flow 110 around the first turbocharger 112, or venting the primary exhaust flow 110 to the bypass flow 108 (refer to the embodiment of FIG. 1B). When the relief valve 116 vents a portion of the primary exhaust flow 110, the first turbocharger 112 receives the remainder 110A of the primary exhaust flow 110 after venting 117. The system 100 further includes a second turbocharger 114 comprising a low pressure charging stage that receives the bypass flow 108 and the primary exhaust flows 110. The second turbocharger 114 includes a turbine 114A and a compressor 114B, mechanically coupled with a turbocharger 114 shaft. If the relief valve 116 vents 117 a portion of the primary flow 110 around the first turbocharger 112, the second turbocharger 114 receives the recombined primary flow 110B and the bypass flow 108. Referring to FIG. 1B, if the relief valve 116 vents 117 a portion of the primary flow 110 to the bypass flow 108, the second turbocharger 114 receives the primary flow 110 and the bypass flow 108, as the bypass flow remainder 110B combined with the bypass flow 108 and vented portion 117 of the primary flow 110.

The system 100 may further include a controller 118 having modules configured to execute preventing overspeed of the turbocharger 112. The controller 118 may include a protection condition module 120 and a relief valve control module 122. The protection condition module 120 determines a protection indicator, and the relief valve control module 122 controls the relief valve 116 according to the protection indicator. The protection indicator may be an engine transient event indicator. The engine transient event indicator may be an indication of whether an engine speed-load change is greater than a first threshold value, and/or whether a user input request change is greater than a second threshold value. For example, the protection condition module 120 may detect an engine transient event has occurred when an engine speed change over 1,000 rpm/second occurs, and the protection condition module 120 may determine the protection indicator is TRUE based on the engine transient event. In the example, the relief valve control module 122 may command the relief valve 116 to open until the engine transient event is completed and the protection condition module 120 determines the protection indicator is FALSE.

Figure 2:
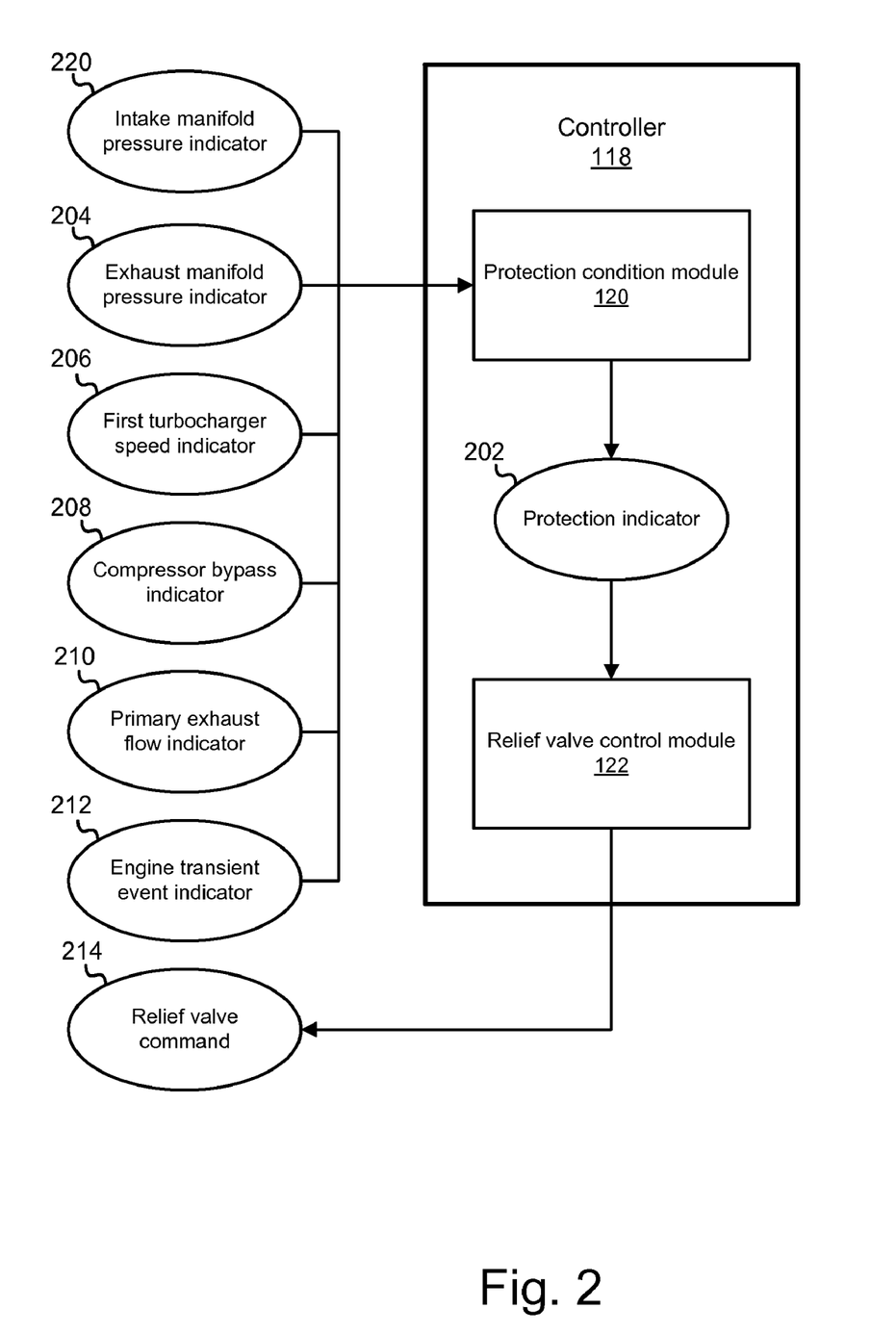
FIG. 2 is a schematic block diagram depicting one embodiment of a controller in accordance with the present invention.

FIG. 2 is a schematic block diagram illustrating one embodiment of a controller 118 in accordance with the present invention. The controller 118 includes a protection condition module 120 that determines a protection indicator 202. The protection indicator 202 may include any indicator from the list of indicators including an exhaust manifold pressure indicator 204, an intake manifold pressure indicator 220, a first turbocharger speed indicator 206, a compressor bypass indicator 208, a primary exhaust flow indicator 210, and/or an engine transient event indicator 212.

The exhaust manifold pressure indicator 204 may be an indication of whether an exhaust manifold pressure 204 exceeds a threshold. The first turbocharger speed indicator 206 may be an indication of whether the first turbine 112A speed exceeds a speed threshold and/or may imminently exceed a speed threshold. The compressor bypass indicator 208 may be an indication of whether a compressor bypass valve 113 has opened, and/or whether other conditions exist—for example an intake manifold pressure—that indicate the compressor bypass valve 113 may be open or may imminently open. The primary exhaust flow indicator 210 may be an indication of whether the primary exhaust flow 110 has exceeded a threshold. The engine transient event indicator 212 may be an indication of whether an engine transient event has occurred or is in progress. For example, the engine transient event indicator 212 may be an indicator that a user input request change is greater than a second threshold value. In the example, the user input request change may be the change accelerator position with respect to time, and the second threshold value may be 80%/second. In the example, a user request change of accelerator position greater than 80% per second (for example—a transition from 0-100% accelerator request in less than 0.8 seconds) may set the engine transient event indicator 212 to TRUE, and the protection condition module 120 may set the protection indicator 202 to TRUE based on the engine transient event indicator 212. In one embodiment, all indicators 204-212 in the system 100 may work together, for example causing the protection condition module 120 to set the protection indicator 202 to TRUE if any indicator 204-212 indicates that protection is needed.

The controller 118 further includes a relief valve control module 122 that controls the relief valve 116 according to the protection indicator 202. For example, if the protection indicator 202 is TRUE, the relief valve control module 122 may command the relief valve 116 OPEN. The relief valve control module 122 may send a relief valve command 214, which may be an electrical voltage, a datalink signal, or the like. In the example, the relief valve control module 122 commands the relief valve 116 CLOSED when the protection indicator 202 is FALSE.

Figure 3A:
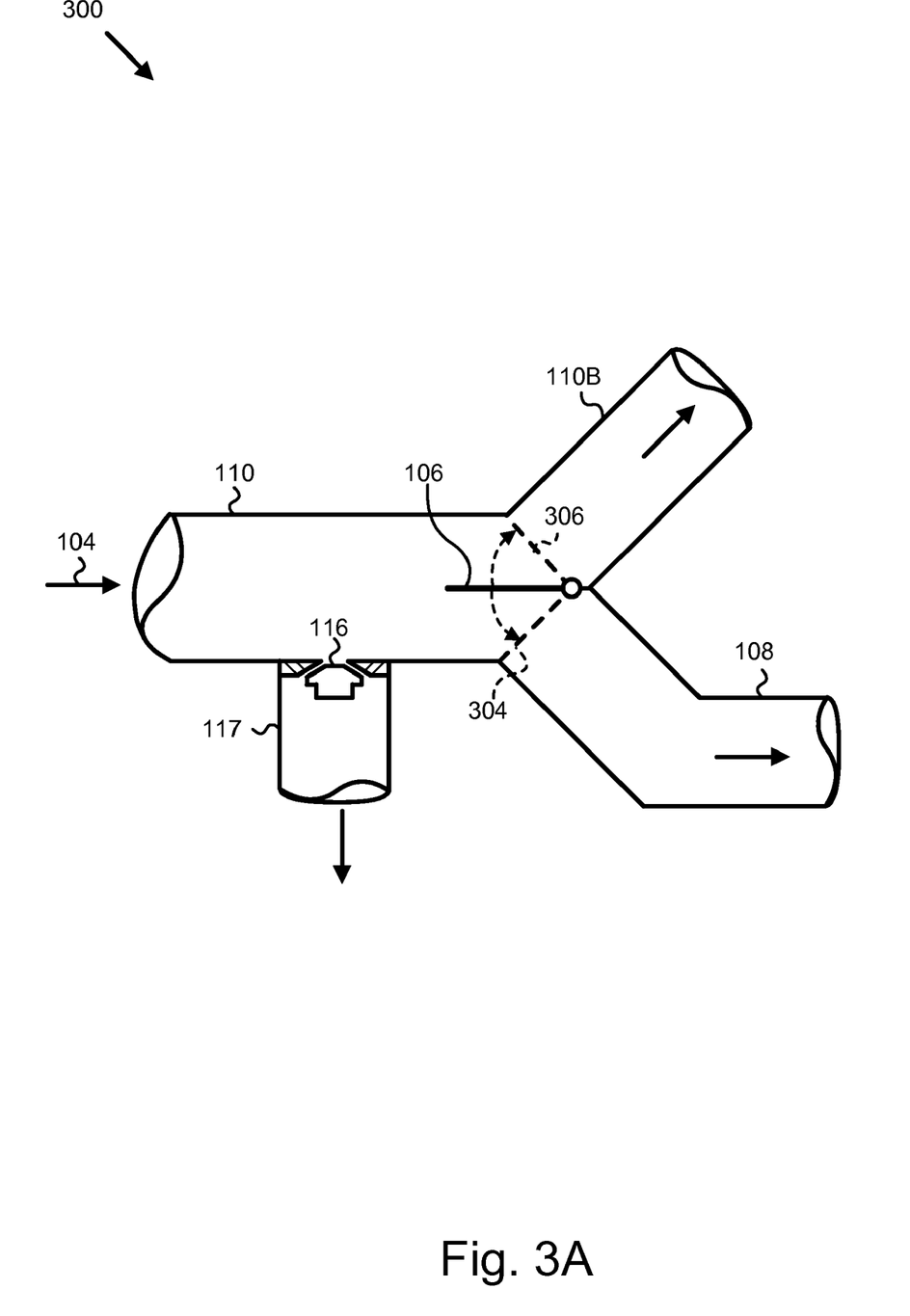
FIG. 3A is a schematic diagram depicting one embodiment of a bypass valve assembly to prevent overspeed of a turbocharger in accordance with the present invention.

FIG. 3A is a schematic diagram depicting one embodiment of a bypass valve assembly 300 to prevent overspeed of a turbocharger in accordance with the present invention. In one embodiment the bypass valve assembly 300 comprises an exhaust flow 104 entering the bypass valve assembly 300. The bypass valve 106 directs flow to the primary exhaust flow 110 in a first position 304, and directs flow to the bypass flow 108 in a second position 306. The bypass valve 106 appears in the schematic of FIG. 3A as a flapper valve 106 to show the logical arrangement of flows 104, 108, 110 with the valve positions 304, 306, but any type of valve 106 known in the art is contemplated within the scope of the invention. It is a mechanical step for one of skill in the art to select a valve type based upon the flow rates, temperatures, and pressures experienced within a given system 100, and to arrange the flows 104, 108, 110 and valve 106 accordingly.

The bypass valve assembly 300 further includes a relief valve 116. The relief valve 116 may be a spring-actuated mechanical valve, an electronically actuated valve, or any other type of valve known in the art. The indicators 204-212 selected for a given embodiment may determine which valve types are appropriate for the relief valve 116. For example, if the exhaust manifold pressure indicator 204 is used in a given embodiment, the relief valve 116 may be spring-actuated, (E.g. where a pressure in the exhaust manifold applies force to an actuator arm overcoming a bias spring and opening the valve—not shown), or electronic where a controller 118 detects the exhaust manifold pressure through a sensor and the relief control module 122 commands 214 the relief valve 116 open when the exhaust manifold pressure exceeds a threshold. The relief valve 116 vents 117 at least a portion of the primary exhaust flow 110, either around the first turbine 112A back into the primary exhaust flow 110 (e.g. as depicted in FIG. 1A) or into the bypass flow 108 (e.g. as depicted in FIG. 1B). The relief valve 116 may be placed upstream of the bypass valve 106 (e.g. as depicted in FIG. 3A) or downstream of the bypass valve 106 (e.g. as depicted in FIG. 1A).

Figure 3B:
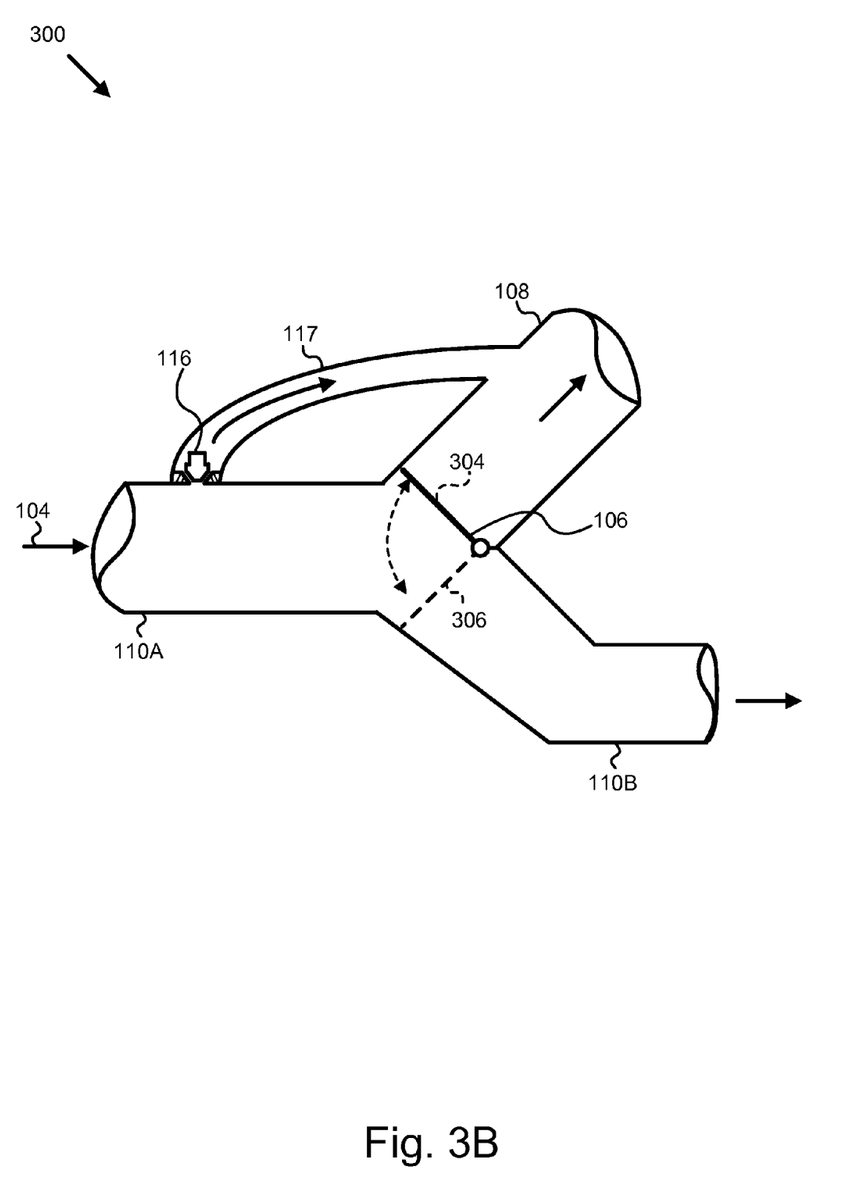
FIG. 3B is a schematic diagram depicting one embodiment of a bypass valve assembly to prevent overspeed of a turbocharger in accordance with the present invention.

FIG. 3B is a schematic diagram depicting one embodiment of a bypass valve assembly 300 to prevent overspeed of a turbocharger in accordance with the present invention. In the embodiment of FIG. 3A, the relief valve 116 vents 117 at least a portion of the primary exhaust flow 110 to the bypass flow 108 when the valve 116 is open. The bypass valve 106 is depicted in the first position 304 such that no flow occurs in the bypass flow 108 except as the relief valve 116 may allow venting 117 into the bypass flow 108 if the valve 116 is open.

Figure 4:
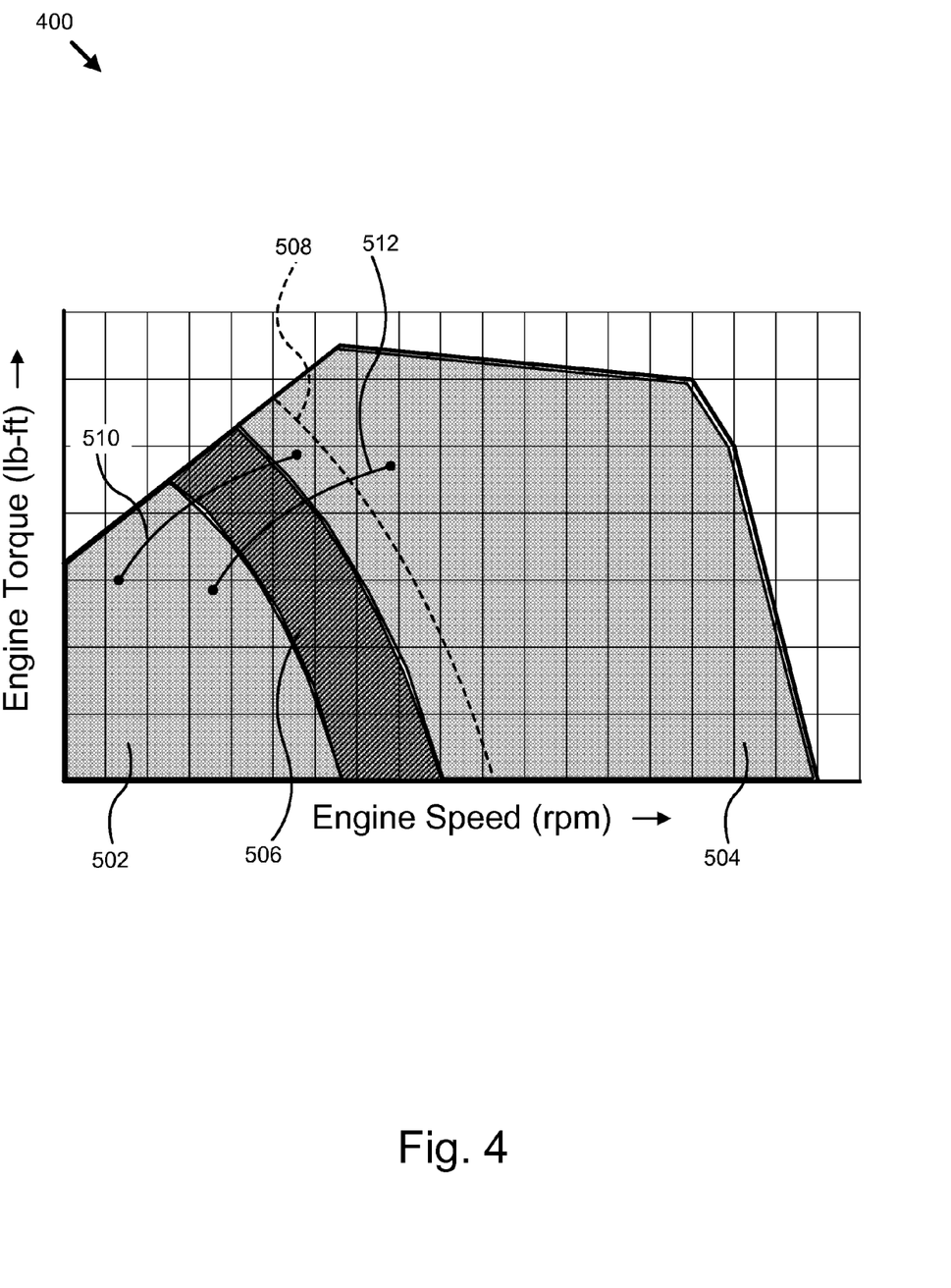
FIG. 4 is an illustration of a duty-cycle map with engine transient events in accordance with the present invention.

FIG. 4 is an illustration of a duty-cycle map 400 with engine transient events in accordance with the present invention. The duty-cycle map 400 includes a first region 502 at relatively low engine speeds and loads where the bypass valve 106 is scheduled to remain closed. The duty-cycle map 400 includes a second region 504 at relatively high engine speeds and loads where the bypass valve 106 is scheduled to be fully open. The duty-cycle map further includes a transition region 506 at medium engine speeds and loads wherein the bypass valve 106 is scheduled to be in an intermediate state between fully open and closed. The duty-cycle map 400 further includes a compressor-bypass line 508, wherein a compressor bypass valve 113 opens above and to the right of the line 508, and closes below and to the left of the line 508. The regions 502, 504, 506 and compressor-bypass line 508 of the duty-cycle map 400 are shown for purposes of illustration only, and the positions and inclusion of each of these features will vary depending upon particular aspects of a given embodiment of the system 100.

A further consideration of the present invention may include providing an indication that the bypass valve 106 is malfunctioning and adjusting components of the system 100 to compensate. For example, an indicator may determine that the bypass valve 106 is stuck closed, and therefore the relief valve 116 may be further configured, under such circumstances, to be opened at considerably higher engine speeds and engine loads than it would under otherwise normal operating parameters.

The duty-cycle map 400 illustrates a first engine transition 510 from the first region 502 to the second region 504. The first engine transition 510 takes the engine from a position on the duty cycle map 400 where the bypass valve 106 is closed to a position where the bypass valve 106 is scheduled to fully open. If the transition 510 occurs quickly, one or more indicators 204-212 may exceed a threshold causing the relief valve control module 122 to command 214 the relief valve 116 open. In one embodiment, the velocity of the transition 510 is calculated (e.g. in units of (rpm-(lb-ft))/second) and if the velocity of the transition 510 exceeds a threshold, the engine transient event indicator 212 is set to TRUE.

The second engine transition 512 takes the engine from a position on the duty cycle map 400 where the bypass valve 106 is closed to a position where the bypass valve 106 is scheduled to fully open, and additionally transitions the engine 102 to a position on the duty cycle map 400 where the compressor bypass valve 113 opens. The second transition 512 is generally more aggressive than the first transition 510, and the second transition 512 causes even greater problems in the current art than the first transition 510. If the transition 512 occurs quickly, one or more indicators 204-212 may exceed a threshold causing the relief valve control module 122 to command 214 the relief valve 116 open. In one embodiment, the velocity of the transition 512 is calculated (e.g. in units of (rpm-(lb-ft))/second) and if the velocity of the transition 512 exceeds a threshold, the engine transient event indicator 212 is set to TRUE. In one embodiment, the second transition 512 causes the compressor bypass indicator 208 to be TRUE, and/or may cause the first turbocharger speed indicator 206 to be TRUE.

Figure 5:
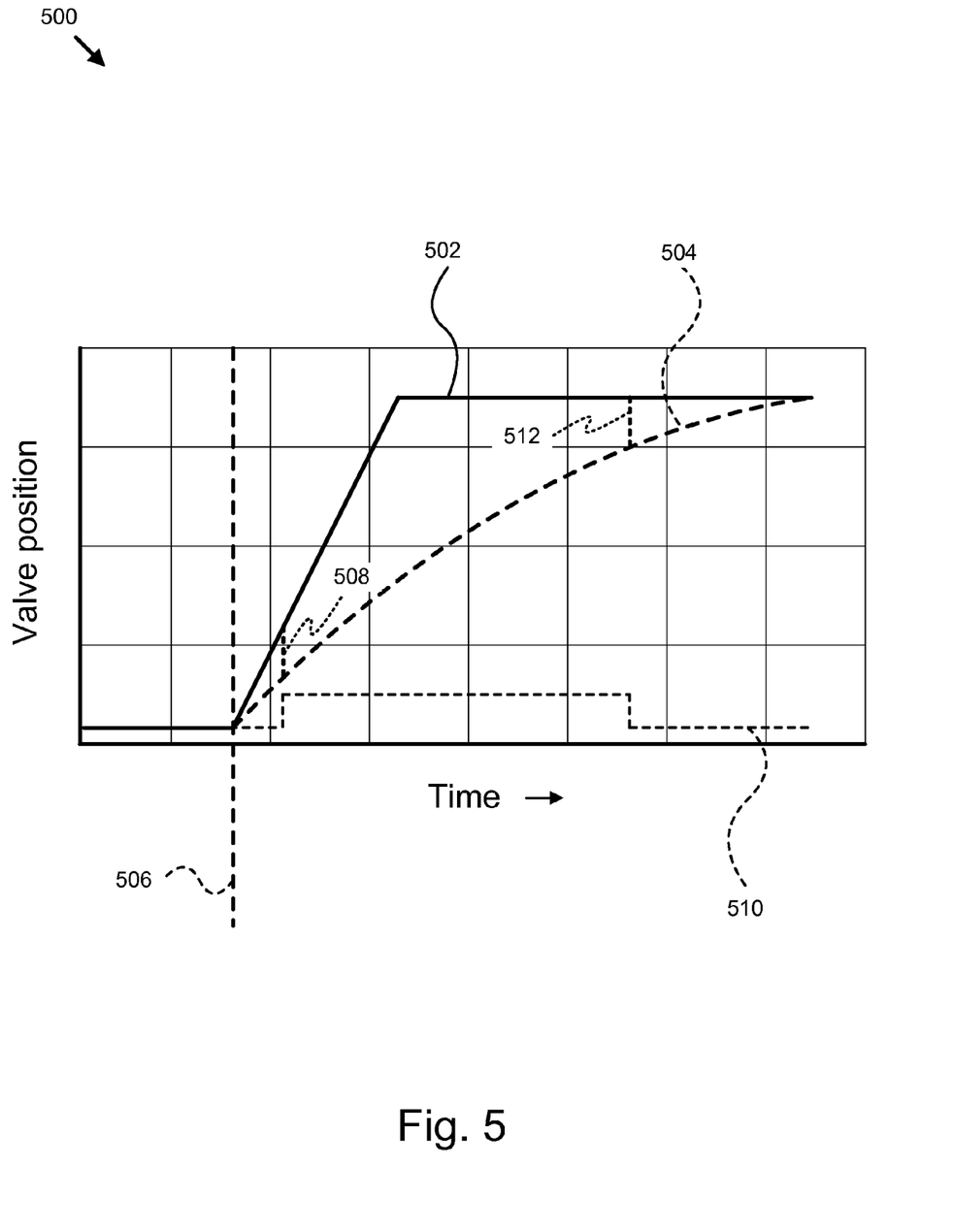
FIG. 5 is an illustration of a bypass valve position and a relief valve position during an engine transient event in accordance with the present invention.

FIG. 5 is an illustration 500 of a bypass valve position and a relief valve position during an engine transient event in accordance with the present invention. One curve shows a desired bypass valve position 502, and another curve shows an actual bypass valve position 504. At a given time 506, a rapid change occurs in the desired bypass valve position 502, which may occur due to an engine transient event. The actual bypass valve position 504 is less responsive than the desired, and at some point a gap 508 between the desired position 502 and the actual position 504 causes the protection indicator 202 to be set where the relief valve 116 opens—as indicated by the step change on the bypass valve position 510. In one embodiment, the gap 508 is measured directly and utilized to open the relief valve 116. However, the gap 508 may also just cause another indicator 204-212 to set the protection indicator 202, or the gap 508 may cause a physical change—for example a raised exhaust manifold pressure, that forces a mechanical relief valve 116 to open. At some point the actual bypass valve position 504 may approach the desired bypass valve position 502 such that a second gap 512 is narrow enough such that the relief valve 116 closes. The closing conditions may vary as the opening conditions vary as described above. The time scale in the illustration 500 varies with the responsiveness of the bypass valve 106—for example the amount of time shown in FIG. 5 may be several hundred milliseconds.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 6:
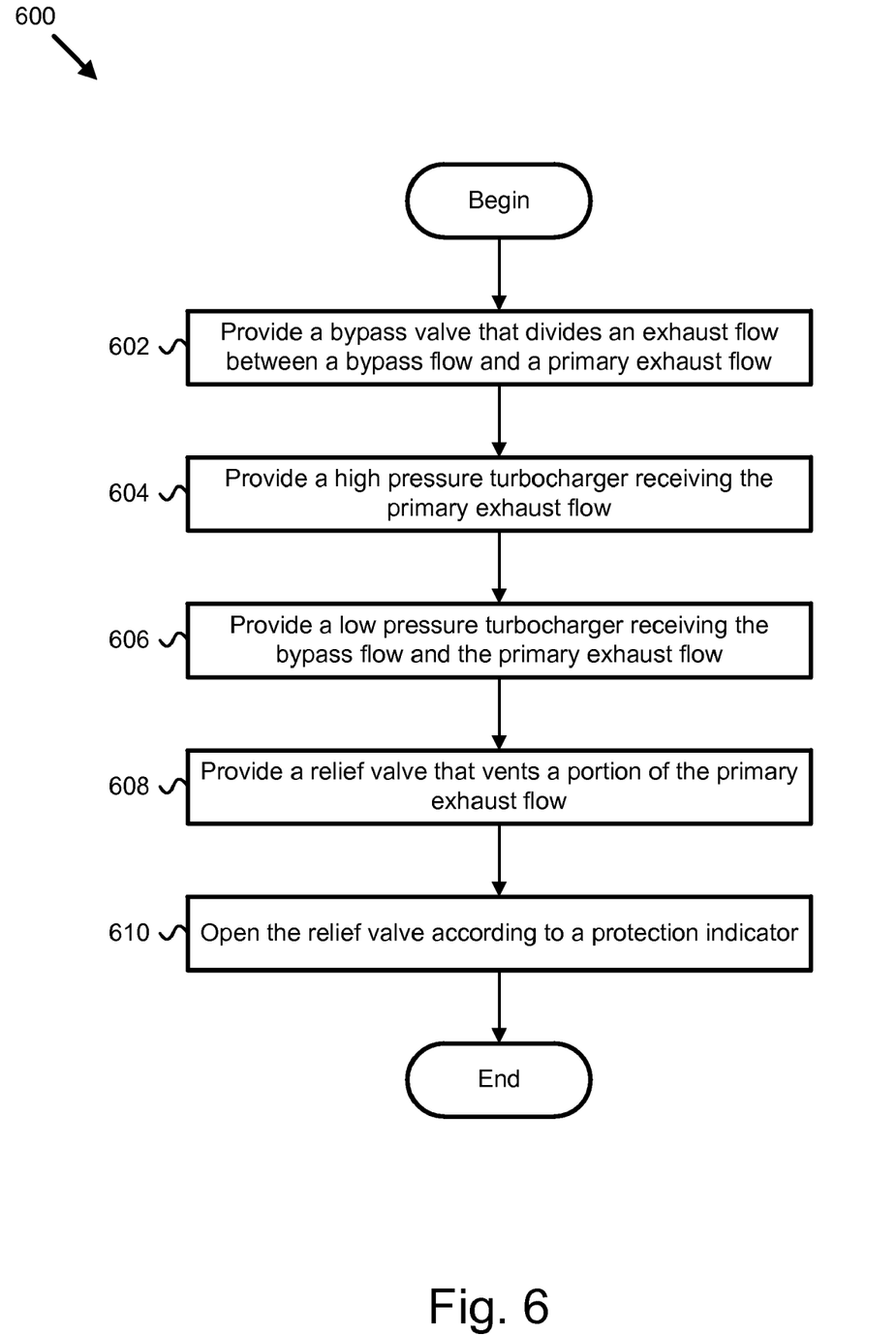
FIG. 6 is a schematic flow chart diagram illustrating one embodiment of a method to prevent overspeed of a turbocharger in accordance with the present invention.

FIG. 6 is a schematic flow chart diagram illustrating one embodiment of a method 600 to prevent overspeed of a turbocharger in accordance with the present invention. The method 600 includes providing 602 a bypass valve that divides an exhaust flow between a bypass flow and a primary exhaust flow. The method 600 further includes providing 604 a high pressure turbocharger comprising a high pressure charging stage and receiving the primary exhaust. The method 600 further includes providing 606 a low pressure turbocharger comprising a low pressure charging stage and receiving the bypass flow and the primary exhaust flow. The method 600 further includes providing 608 a relief valve that vents at least a portion of the primary exhaust flow when the relief valve is open. The method 600 further includes a relief valve control module 122 opening 610 the relief valve according to a protection indicator.

Figure 7:
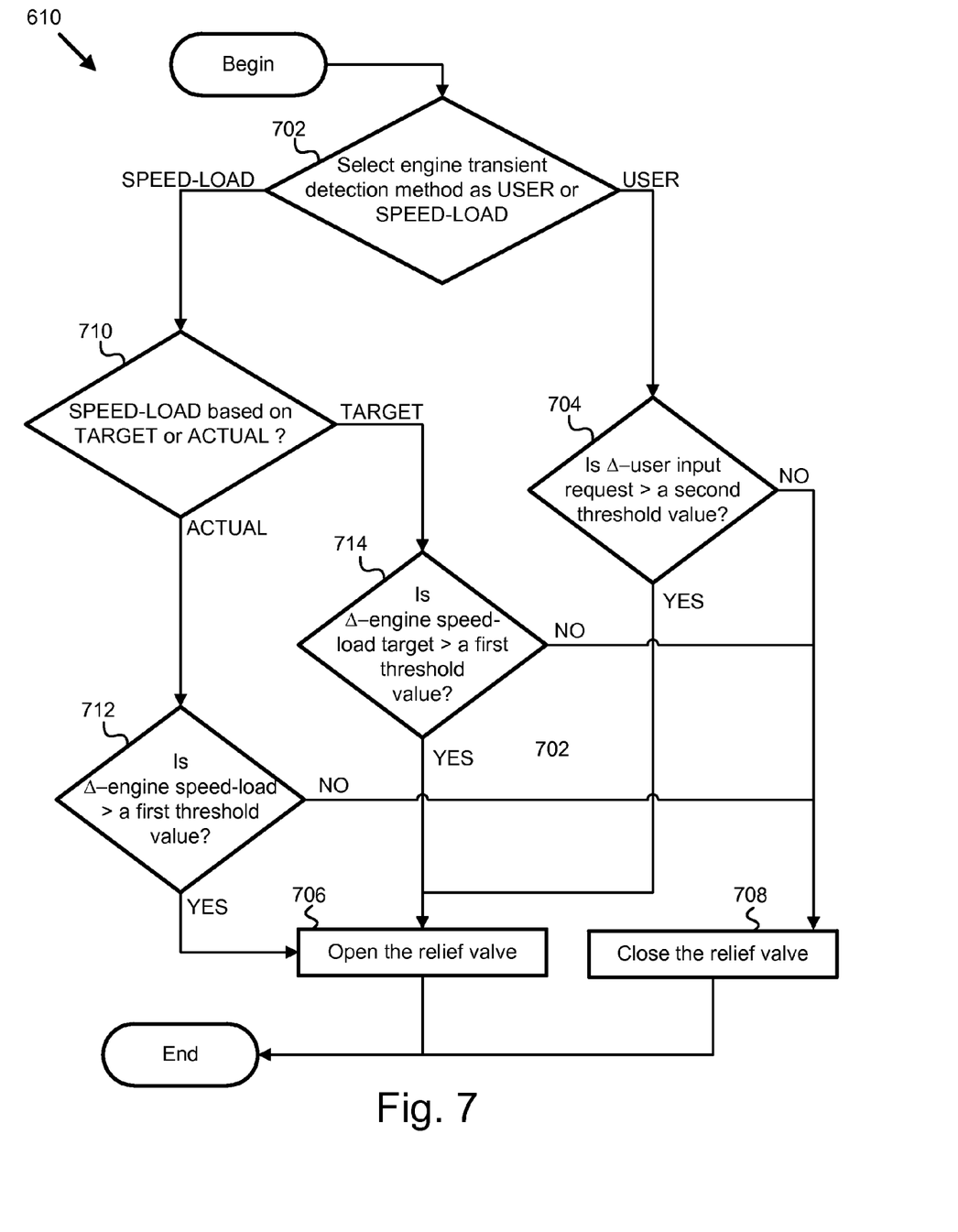
FIG. 7 is a schematic flow chart diagram illustrating one embodiment of a method for opening a relief valve according to a protection indicator in accordance with the present invention.

FIG. 7 is a schematic flow chart diagram illustrating one embodiment of a method for opening 610 a relief valve according to a protection indicator in accordance with the present invention. The method 610 includes opening the relief valve according to the protection indicator by determining an engine transient event indicator, and opening the relief valve according to the engine transient event indicator. In one embodiment, the method 610 includes determining the engine transient event indicator by determining whether an engine speed-load change is greater than a first threshold value. In one embodiment, the method 610 includes determining the engine transient event indicator by determining whether a target engine speed-load change is greater than a first threshold value. In one embodiment, the method 610 includes determining the engine transient event indicator by determining whether a user input request change is greater than a second threshold value.

The method 610 begins by selecting 702 whether an engine transient detection method is USER or SPEED-LOAD. If the engine transient detection method is USER, the method 610 includes a protection condition module checking 704 whether a change (Δ) in an user input request is greater than a second threshold value. The method 610 includes opening 706 the relief valve (check 704 with a YES resolution) or closing 708 the relief valve (check 704 with a NO resolution). In one embodiment, if the engine transient detection method is SPEED-LOAD, the method 610 includes checking 710 whether the SPEED-LOAD check is a check against the TARGET speed-load or the ACTUAL speed-load. If the check is for the ACTUAL speed load, the method 610 includes checking 712 whether a Δ-engine speed-load is greater than a first threshold value. If the check is for the TARGET speed-load, the method 610 includes checking 714 whether a Δ-engine speed-load target is greater than the first threshold value. The method 610 includes a relief valve control module 122 opening 706 the relief valve (check 712 and/or 714 with a YES resolution) or a relief valve control module 122 closing 708 the relief valve (check 712 and/or 714 with a NO resolution).

Figure 8:
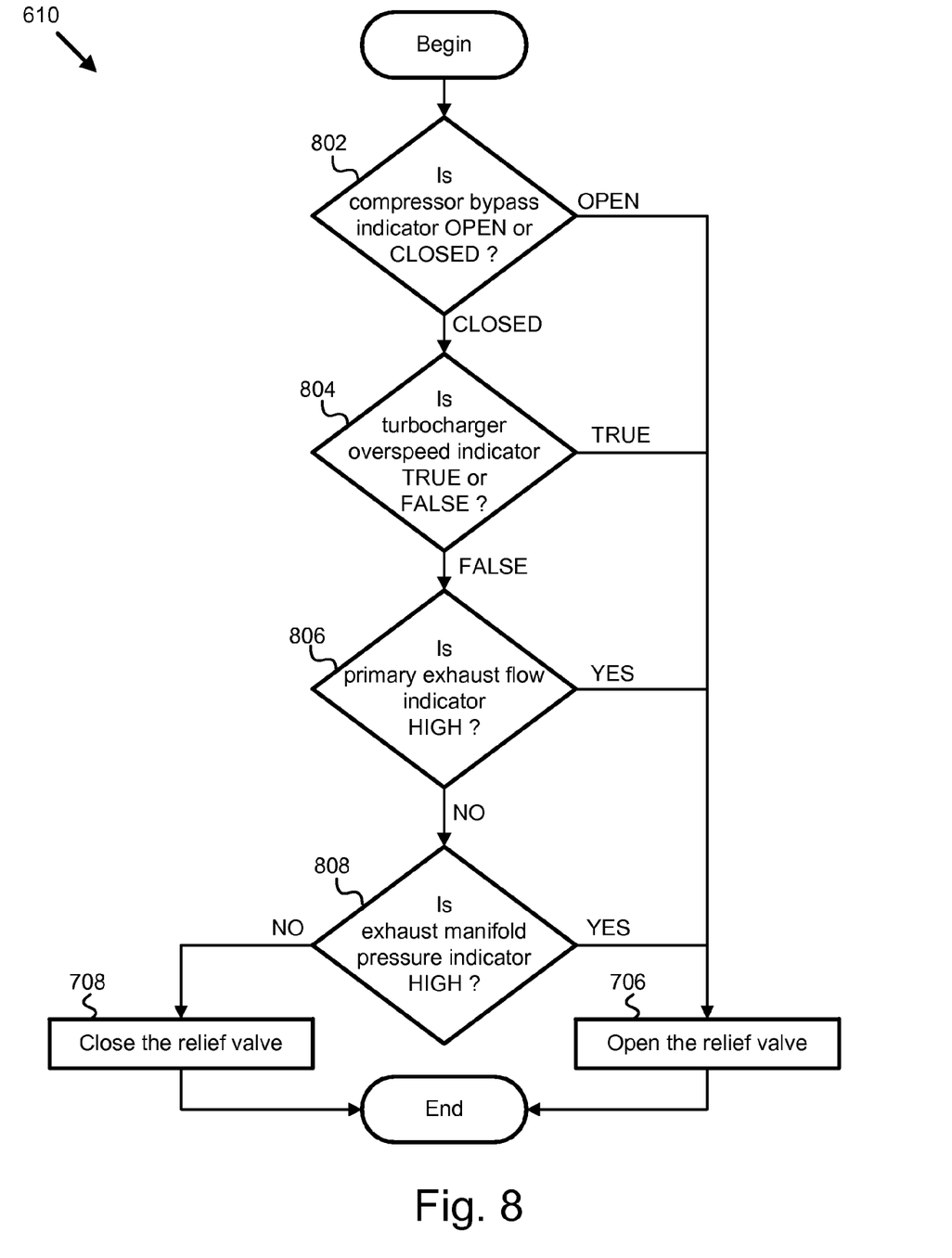
FIG. 8 is a schematic flow chart diagram illustrating an alternate embodiment of a method for opening a relief valve according to a protection indicator in accordance with the present invention.

FIG. 8 is a schematic flow chart diagram illustrating an alternate embodiment of a method 610 for opening a relief valve according to a protection indicator in accordance with the present invention. In one embodiment, the method 610 includes opening the relief valve according to the protection indicator by determining a first turbocharger overspeed indicator, and opening the relief valve according to the first turbocharger overspeed indicator. In one embodiment, the method 610 includes opening the relief valve according to the protection indicator by determining a compressor bypass indicator, and opening the relief valve according to the compressor bypass indicator. In one embodiment, the method 610 includes opening the relief valve according to the protection indicator by determining a primary exhaust flow indicator, and opening the relief valve according to the primary exhaust flow indicator. In one embodiment, the method 610 includes opening the relief valve according to the protection indicator by determining an exhaust manifold pressure indicator, and opening the relief valve according to the exhaust manifold pressure indicator.

In one embodiment, the method 610 includes a protection condition module checking 802 whether a compressor bypass indicator is OPEN or CLOSED. If the compressor bypass indicator is OPEN, the method 610 includes a relief valve control module 122 opening 706 the relief valve. If the compressor bypass indicator is CLOSED, the method 610 includes a protection condition module checking 804 whether a turbocharger overspeed indicator is TRUE or FALSE. If the turbocharger overspeed indicator is TRUE, the method 610 includes a relief valve control module 122 opening 706 the relief valve. If the turbocharger overspeed indicator is FALSE, the method 610 includes a protection condition module checking 806 whether a primary exhaust flow indicator is HIGH. If the primary exhaust flow indicator is HIGH, the method 610 includes a relief valve control module 122 opening 706 the relief valve. If the primary exhaust flow indicator is not HIGH, the method 610 includes a protection condition module checking 808 whether an exhaust manifold pressure indicator is HIGH. If the exhaust manifold pressure indicator is HIGH, the method includes a relief valve control module 122 opening 706 the relief valve. If the exhaust manifold pressure indicator is not HIGH, the method includes a relief valve control module 122 closing 708 the relief valve.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:
1. A method for preventing overspeed of a turbocharger in an internal combustion engine system comprising an internal combustion engine capable of generating an exhaust flow, the method comprising:

providing a bypass valve that divides the exhaust flow between a bypass flow and a primary exhaust flow;

providing a first turbocharger comprising a high pressure charging stage, the first turbocharger receiving the primary exhaust flow;

bypassing the bypass flow around the first turbocharger;

providing a second turbocharger comprising a low pressure charging stage, the second turbocharger receiving the bypass flow and the primary exhaust flow;

providing a relief valve that vents at least a portion of the primary exhaust flow around the first turbocharger when the relief valve is open, the vented portion of the primary exhaust flow being received by the second turbocharger; and opening the relief valve based on whether a protection indicator meets a threshold; and wherein opening the relief valve based on whether the protection indicator meets a threshold comprises determining an engine transient event indicator, and opening the relief valve based on whether the engine transient event indicator meets an engine transient event threshold; and wherein determining the engine transient event indicator comprises determining at least one of whether an engine speed-load change is greater than an engine speed-load change threshold value, whether a target engine speed-load change is greater than a target engine speed-load change threshold value, and whether a user input request change is greater than a user input request change threshold value.

2. The method of claim 1, wherein opening the relief valve according to the protection indicator comprises determining a first turbocharger overspeed indicator, and opening the relief valve based on whether the first turbocharger overspeed indicator meets a first turbocharger overspeed indicator threshold.

3. The method of claim 1, wherein opening the relief valve according to the protection indicator comprises determining a compressor bypass indicator, and opening the relief valve based on whether the compressor bypass indicator meets a compressor bypass indicator threshold.

4. The method of claim 1, wherein opening the relief valve according to the protection indicator comprises determining a primary exhaust flow indicator, and opening the relief valve based on whether the primary exhaust flow indicator meets a primary exhaust flow indicator threshold.

5. The method of claim 1, wherein opening the relief valve according to the protection indicator comprises determining an exhaust manifold pressure indicator, and opening the relief valve based on whether the exhaust manifold pressure indicator meets an exhaust manifold pressure indicator threshold.

6. The method of claim 1, wherein opening the relief valve according to the protection indicator comprises determining an intake manifold pressure indicator, and opening the relief valve based on whether the intake manifold pressure indicator meets an intake manifold pressure indicator threshold.

7. A system to prevent overspeed of a turbocharger, the system comprising:

an internal combustion engine producing an exhaust flow;

a bypass valve that divides the exhaust flow between a bypass flow and a primary exhaust flow;

a first turbocharger comprising a high pressure charging stage, the first turbocharger receiving the primary exhaust flow;

a second turbocharger comprising a low pressure charging stage, the second turbocharger receiving the bypass flow and the primary exhaust flow;

a relief valve that vents at least a portion of the primary exhaust flow when the relief valve is open;

a protection condition module configured to determine a protection indicator; and a relief valve control module configured to open the relief valve according to the protection indicator;

wherein the protection indicator comprises an engine transient event indicator, wherein the engine transient event indicator comprises an indication of one of: whether an engine speed-load change is greater than a first threshold value and whether a user input request change is greater than a second threshold value.

8. An apparatus to prevent overspeed of a turbocharger in an internal combustion engine system comprising an internal combustion engine capable of generating an exhaust flow, the apparatus comprising:

a bypass valve that divides the exhaust flow between a bypass flow and a primary exhaust flow;

a first turbocharger comprising a high pressure charging stage, the first turbocharger receiving the primary exhaust flow, and the bypass flow being bypassed around the first turbocharger via a bypass line;

a second turbocharger comprising a low pressure charging stage, the second turbocharger receiving the bypass flow and the primary exhaust flow; and a relief valve that vents at least a portion of the primary exhaust flow around the first turbocharger when the relief valve is open, the vented portion of the primary exhaust flow being received by the second turbocharger;

wherein the relief valve opens based on whether a protection indicator meets a threshold, wherein the protection indicator comprises an engine transient event indicator, and wherein the engine transient event indicator comprises an indication of at least one of: whether an engine speed-load change is greater than a first threshold value and whether a user input request change is greater than a second threshold value.

9. The apparatus of claim 8, wherein the protection indicator comprises an exhaust manifold pressure indicator.

10. The apparatus of claim 8, wherein the protection indicator comprises a first turbocharger speed indicator.

11. The apparatus of claim 8, wherein the protection indicator comprises a compressor bypass indicator.

12. The apparatus of claim 8, wherein the protection indicator comprises a primary exhaust flow indicator.

13. The apparatus of claim 8, wherein the relief valve comprises a spring-actuated mechanical valve.

14. The apparatus of claim 8, wherein the relief valve comprises an electronically actuated valve.

15. The apparatus of claim 1, wherein the relief valve is positioned downstream of the bypass valve.

16. An apparatus to prevent overspeed of a turbocharger in an internal combustion engine system comprising an internal combustion engine capable of generating an exhaust flow, the apparatus comprising:

a bypass valve that divides the exhaust flow between a bypass flow and a primary exhaust flow;

a first turbocharger comprising a high pressure charging stage, the first turbocharger receiving the primary exhaust flow, and the bypass flow being bypassed around the first turbocharger via a bypass line;

a second turbocharger comprising a low pressure charging stage, the second turbocharger receiving the bypass flow and the primary exhaust flow;

a relief valve that vents at least a portion of the exhaust flow when the relief valve is open;

a protection condition module configured to determine a protection indicator; and a relief valve control module configured to open the relief valve based on whether the protection indicator meets a threshold;

wherein the protection indicator comprises an indicator selected from the indicators consisting of: an exhaust manifold pressure indicator, a first turbocharger speed indicator, a compressor bypass indicator, a primary exhaust flow indicator, and an engine transient event indicator; and wherein the engine transient event indicator comprises an indication of one of: whether an engine speed-load change greater than a first threshold value and whether a user input request change is greater than a second threshold value.

17. The apparatus of claim 16, wherein the relief valve vents at least a portion of the primary exhaust flow around the first turbocharger.

18. The apparatus of claim 16, wherein the relief valve vents the at least a portion of the primary exhaust flow into the bypass flow.

19. The apparatus of claim 16, wherein the bypass valve is positioned downstream of the relief valve.

* * * * *